United States Patent
Lee et al.

(10) Patent No.: US 9,609,323 B2
(45) Date of Patent: Mar. 28, 2017

(54) ITERATIVE VIDEO OPTIMIZATION FOR DATA TRANSFER AND VIEWING

(71) Applicants: Yuchun Lee, Needham, MA (US);
Andre Black, Revere, MA (US);
Edward Chin, Canton, MA (US);
Mark Magnacca, Marstons Mills, MA (US); Ruby Kennedy, Bedford, MA (US)

(72) Inventors: Yuchun Lee, Needham, MA (US);
Andre Black, Revere, MA (US);
Edward Chin, Canton, MA (US);
Mark Magnacca, Marstons Mills, MA (US); Ruby Kennedy, Bedford, MA (US)

(73) Assignee: Allego Inc., Needham, MA (US)

( * ) Notice: Subject to any disclaimer, the term of this patent is extended or adjusted under 35 U.S.C. 154(b) by 315 days.

(21) Appl. No.: 14/315,583

(22) Filed: Jun. 26, 2014

(65) Prior Publication Data

US 2015/0381989 A1     Dec. 31, 2015

(51) Int. Cl.
*H04N 19/117* (2014.01)
*H04N 19/15* (2014.01)
(Continued)

(52) U.S. Cl.
CPC .......... *H04N 19/117* (2014.11); *H04N 19/15* (2014.11); *H04N 19/154* (2014.11);
(Continued)

(58) Field of Classification Search
CPC .... H04N 19/164; H04N 19/85; H04N 19/503;
H04N 19/146; H04N 19/61; H04N 19/192; H04N 19/42; H04N 19/107; H04N 19/60; H04N 19/176; H04N 19/152; H04N 19/137; H04N 19/189; H04N 19/00345; H04N 19/00193; H04N 21/26616; H04N 19/124; H04N 19/86; H04N 19/154; H04N 19/172; H04N 19/197; H04N 19/002; H04N 19/00024; H04N 19/00266; H04N 19/00903; H04N 19/00; H04N 5/23222; H04N 5/23219; H04N 1/2133; H04N 2201/3278; H04N 1/32101; H04N 2201/3225; H04N 1/00307; H04N 19/132; H04N 19/188; H04N 19/169; H04N 19/436; H04N 21/439; H04N 21/23439; H04N 19/17;
(Continued)

(56) References Cited

U.S. PATENT DOCUMENTS 7,636,933 B2 * 12/2009 Kortum ................. H04H 60/46
725/86
8,789,081 B2 * 7/2014 Parker ................. H04N 17/004
348/184
(Continued)

OTHER PUBLICATIONS

Entitled "Computer Based Training Techniques for Geographically Distributed Individuals", Yuchun Lee et al., filed Jun. 26, 2014.

*Primary Examiner* — Dramos I Kalapodas
(74) *Attorney, Agent, or Firm* — Fish & Richardson P.C.

(57) ABSTRACT

Computer-implemented techniques that leverage available CPU resources to incrementally improve quality and compression of media for faster transfer over data networks for improved viewing are described.

27 Claims, 4 Drawing Sheets

(51) Int. Cl.
*H04N 19/154* (2014.01)
*H04N 19/162* (2014.01)
*H04N 19/179* (2014.01)
*H04N 19/192* (2014.01)

(52) U.S. Cl.
CPC ......... *H04N 19/162* (2014.11); *H04N 19/179* (2014.11); *H04N 19/192* (2014.11)

(58) Field of Classification Search
CPC .... H04N 19/182; H04N 19/50; H04N 19/126; H04N 19/136; G06Q 10/063; H04L 65/80; H04L 65/4084; H04L 67/1023; H04L 67/1021; H04L 67/101; H04L 47/125; H04L 67/1004; G06F 17/30905; G06F 15/16; G06F 2212/401; G06F 12/0886; G06F 17/30244; G06F 17/30085; G06F 17/30117; H03M 7/6058; H03M 7/3084; H03M 7/3086; H03M 7/30; H03M 7/3064; G06T 5/00; G06T 5/001; G06K 9/6218; G06K 9/6215; G06K 9/4647; G06K 9/00; G06K 9/00577; G06K 9/4652; G06K 9/4604; H04M 1/0264; H04M 1/0202; H04W 4/001; A63F 13/77; A63F 13/12; A63F 13/335; A63F 13/355; A63F 13/358; A63F 2300/538

See application file for complete search history.

(56) References Cited

U.S. PATENT DOCUMENTS

| | | | |
|---|---|---|---|
| 2010/0061446 A1* | 3/2010 | Hands | H04N 19/196 375/240.02 |
| 2011/0274361 A1* | 11/2011 | Bovik | G06K 9/00664 382/224 |
| 2012/0327243 A1* | 12/2012 | Rezvani | H04W 4/14 348/158 |
| 2013/0110565 A1 | 5/2013 | Means et al. | |
| 2014/0177734 A1* | 6/2014 | Carmel | H04N 19/124 375/240.26 |
| 2014/0200460 A1* | 7/2014 | Johnson | A61B 5/0077 600/479 |
| 2014/0211859 A1* | 7/2014 | Carmel | H04N 19/00903 375/240.26 |
| 2015/0023404 A1* | 1/2015 | Li | H04L 65/4084 375/240.02 |
| 2015/0049957 A1* | 2/2015 | Carmel | H04N 19/176 382/239 |
| 2015/0285935 A1* | 10/2015 | Savels | G01V 1/364 702/17 |

* cited by examiner

ITERATIVE VIDEO OPTIMIZATION FOR DATA TRANSFER AND VIEWING

BACKGROUND

This invention relates to techniques for processing of media such as video and more particularly to compression and computer-implemented techniques to improve media quality.

The production and consumption of media, especially video produced by individuals for personal use or sharing, is commonplace and rapidly growing. Videos are viewed by individuals on a wide variety of devices including desktop computers, laptops, tablets, and mobile, hand-held devices like smart phones. Video files are frequently stored in the cloud and are streamed over a network for viewing.

SUMMARY

Networks may vary greatly in their transmission bandwidth, especially on wireless and mobile networks. Viewer enjoyment and satisfaction are closely tied to the ability for the video to play quickly and smoothly with high quality and without interruption. While according to Moore's law, CPU processing speeds double approximately every 18 months (about 60% growth) Jakob Neilsen's law of Internet Bandwidth indicates that network bandwidth growth is only about 50% (See http://www.nngroup.com/articles/law-of-bandwidth) over a similar period. Thus, Jakob Nielsen concluded "bandwidth will remain the gating factor in the experienced quality of using the Internet medium."

Based on this recognition, it is clear that network bandwidth is more limiting than CPU processing in video transport. Because network bandwidth is more limiting than CPU processing, this should be taken into consideration when seeking to improve video quality and/or compression.

Aspects of the invention include a system including a processor and memory storing a computer program product for improving quality of video files. The computer program product includes instructions for causing the processor to apply a set of batch processes over multiple passes to optimize the video, by configuring the processor to apply one or more of the processes from the set to the video to improve an aspect of video quality of the video, determine a video quality score based on applying the one or more processes to the video, compress the video to produce a compressed representation having a smaller file size that a file size prior to compressing the video, determine a video compression score, determine a video optimization score that is based at least in part on the determined video quality score and determined video compression score, and analyze the video optimization score to determine whether to provide an additional pass to optimize the video.

According to an additional aspect of the invention, a computer-implemented method includes applying one or more computer systems a set of batch processes over multiple passes to optimize the video, by the systems applying one or more processes to the video to improve in some aspect video quality, determining a video quality score based on applying the one or more processes to the video, compressing the video to produce compressed representation having a smaller file size, determining a video compression score, determining a video optimization score that is based on the determined video quality score and determined video compression score, and analyzing the video optimization score to determine whether to provide an additional pass.

Aspects of the invention include a computer program product tangibly stored on a computer readable hardware storage device for improving quality of video files, the computer program product including instructions for causing a processor to apply a set of batch processes over multiple passes to optimize the video, by configuring the processor to apply one or more processes to the video to improve in some aspect video quality, determine a video quality score based on applying the one or more processes to the video, compress the video to produce compressed representation having a smaller file size, determine a video compression score, determine a video optimization score that is based on the determined video quality score and determined video compression score, and analyze the video quality score to determine whether to provide an additional pass.

The following are some of the embodiments within the scope of the above aspects.

The processor is configured by the program to incrementally remove noise from the video. The processor is configured by the program to incrementally correct the video by visually aligning frames of video to remove handshaking movements. The processor is configured by the program to incrementally correct the video by applying a pixel-based image processing to smooth and blend the image. The processor is configured by the program to incrementally correct the video by applying a Ricker wavelet function to reduce random pixilation. The processor is configured by the program to incrementally execute the functions of the program. The video is self-captured video. The processor is configured by the program to incrementally execute the functions of the program as a background process. The processor is configured by the program to determine when a stopping condition is satisfied to obviate the need for further passes. The processor is configured by the program to determine a priority score representing when relative to other videos the video should be processed. The processor is configured by the program to determine a second video quality score, determine a second video compression score and determine a second video optimization score based at least in part of the determined second video and second compression scores. The determined video optimization score is used to determine whether a current optimized iteration of the video should replace a previous optimized iteration.

One or more aspects may provide one or more of the following advantages. These aspects provide techniques for quickly making a video available for consumption, while incrementally improving video quality and compression. These techniques minimize lag time so that video can be shared with others as quickly as possible, while improving the viewing experience over time in both video quality and transmission performance through the use of optimization and compression techniques. This approach trades-off the more readily available CPU resources to optimize use of the more restricted network bandwidth/transmission rates.

The implementations use parallel ingestion using fast compression techniques to upload a video file as quickly as possible. Once the video is stored in the cloud, any video optimization or compression technique can be leveraged (singly, in parallel, and/or in series) in an offline batch process to improve the video. After one or more techniques are applied, a "quality score" is assigned to each candidate video representing the visual appeal of the video. The "selection algorithm" chooses from among multiple candidate videos based on a function (video optimization score) of the quality score and the compression size to choose the "winning" optimized video. This process repeats until the improvement of the candidate videos over the current optimized video is no longer "valuable."

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2A is a flow chart depicting details of parallel ingestion processing.

FIG. 3A is a flow chart of details of analysis processing.

DETAILED DESCRIPTION

Figure 1:
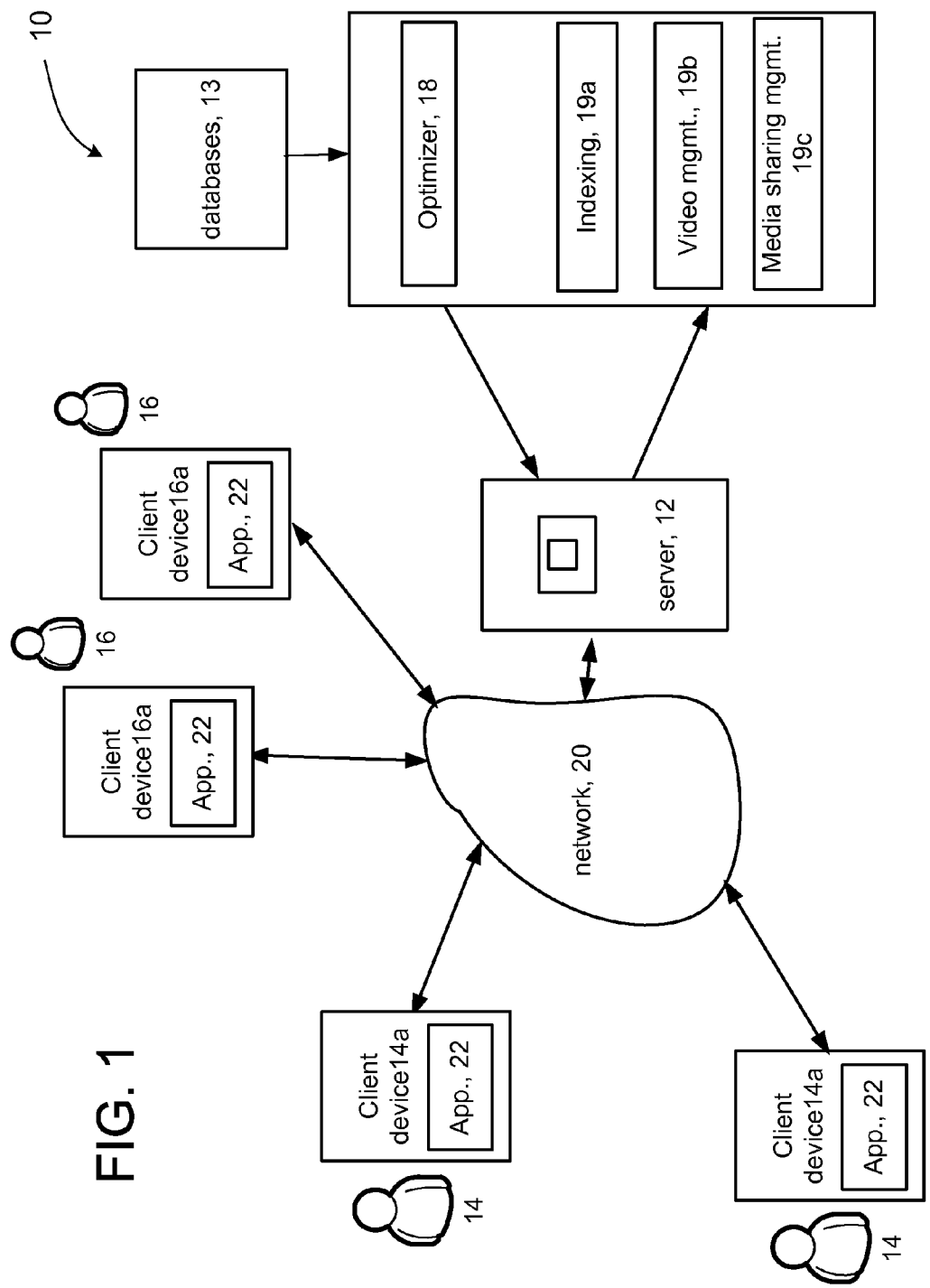
FIG. 1 is a block diagram of a system for optimization of video.

Referring now to FIG. 1, an exemplary networked computer platform 10 "platform 10" enables video, such as user produced video, to be uploaded to a server/database for access by other users. One type of video is self-captured video. The platform 10 includes a computer server system (server) 12 for processing of video sent by users 14 and taken, e.g., with client systems 14a or other video systems. Video processed by server 12 is stored in a database 13 and can be accessed by other users 16 via client systems 16a. Server 12, devices 14a and 16a, etc. are interconnected via a network 20, e.g., the Internet or other network that can be wired or wireless or combinations thereof. Client devices 14a, 16a include an application 22 that is used to interface with the server, e.g., a web browser or the like. Server 12 includes a web server.

Server 12 executes an optimizer process 18 that optimizes such video for relatively fast retrieval and improved video quality compared to such video that is not subject to the optimizer process. The database 13 also contains configuration settings and other information in addition to the video. The server 12 executes the optimizer process 18 incrementally, over periods of time, as discussed below. Client devices 14a and 16a can be any combination of, e.g., personal digital assistants, cell phones, computer systems, media-player-type devices, tablet computers, and so forth. The client devices 14a enable the users 14 to input and receive information as well as to upload media, e.g., video and audio.

In one embodiment, the platform 10 is implemented in a cloud-based environment for long-term storage and management of captured media with servers in the cloud having instances of the optimizer 18. The optimizer 18 execute on those servers to optimize the video as will be discussed below. In addition, processes can be included to analyze the media to generate useful metadata and previews to index 19a the media allowing users to find specific media and distinguish specific media from other similar media, video management 19b and media sharing 19c applications. The optimizing process 18 is used for the cloud-based background processing to incrementally compress the media to ever-smaller file sizes for faster transport across networks.

Figure 2:
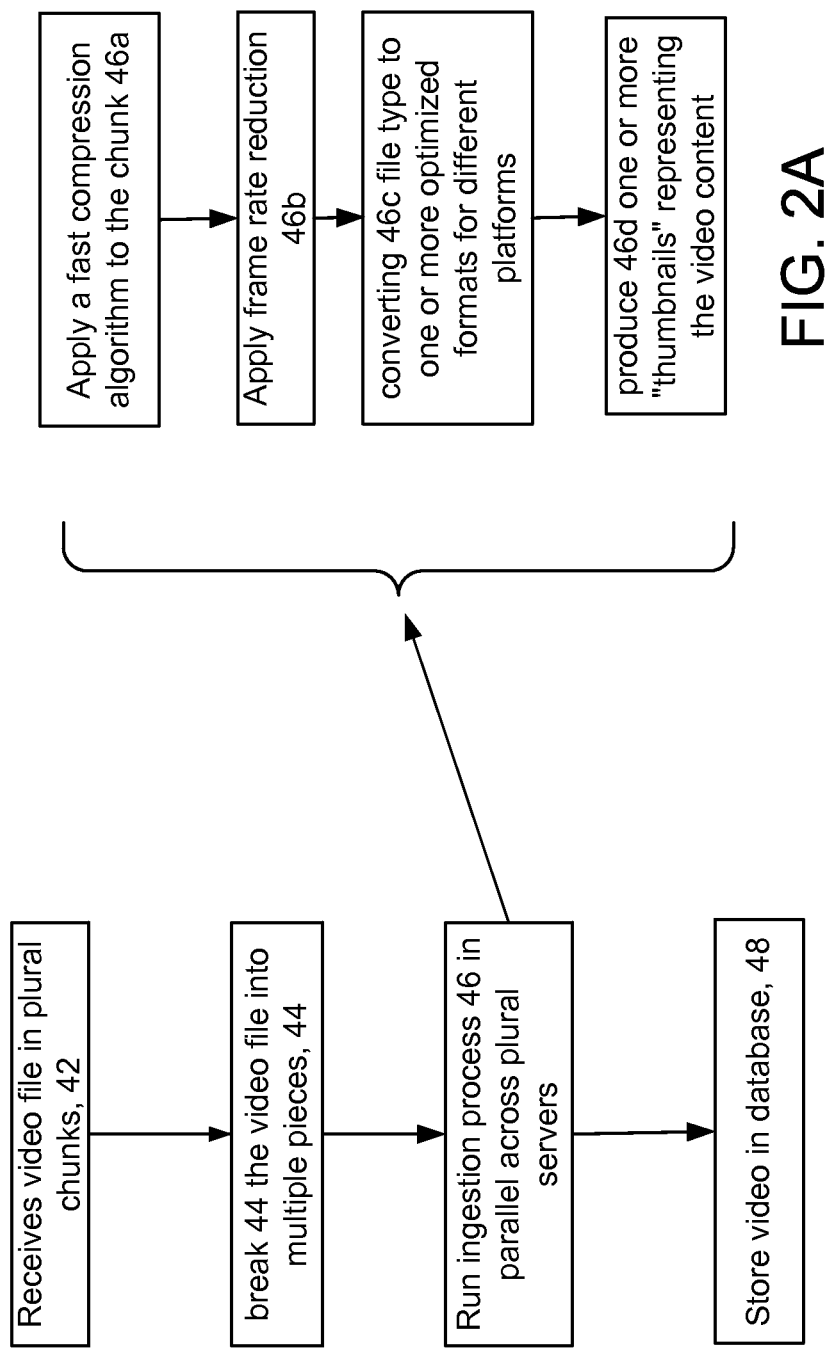
FIG. 2 is a flow chart of the incremental video optimization process.

Referring to FIG. 2, a user on client device 14a uploads a video file to the cloud. One or more servers 12 run an intake process 40. The one or more servers 12 receive 42 the video file, which may be uploaded in chunks, e.g., a series of files of video data that together form the complete video. Once the video file has been received, the one or more servers 12 break 44 the video file into multiple file portions 44 and run instances of an ingestion process 46 on each file portion. One of the servers assigns file portions to others of the servers, and the servers run instances of the ingestion process 46 in parallel. The ingestion process 46 is a first-time pass through the video file. After the first-time pass through the video file, the servers store 48 the video in database 13.

Referring to FIG. 2A, details of an implementation of the ingestion process 46 are shown. The ingestion process 49 includes applying 46a a fast compression technique (e.g., H264), frame rate reduction 46b, and conversion 46c of the file type to one or more optimized formats for different platforms (e.g., .mp4 for Windows (Microsoft Corporation) and .hls for iOS (Apple Inc.)). The ingestion process 46 may also include a process 46d to provide one or more "thumbnails" representing the video content in the form of one or more still images that can be displayed to the user.

Figure 3:
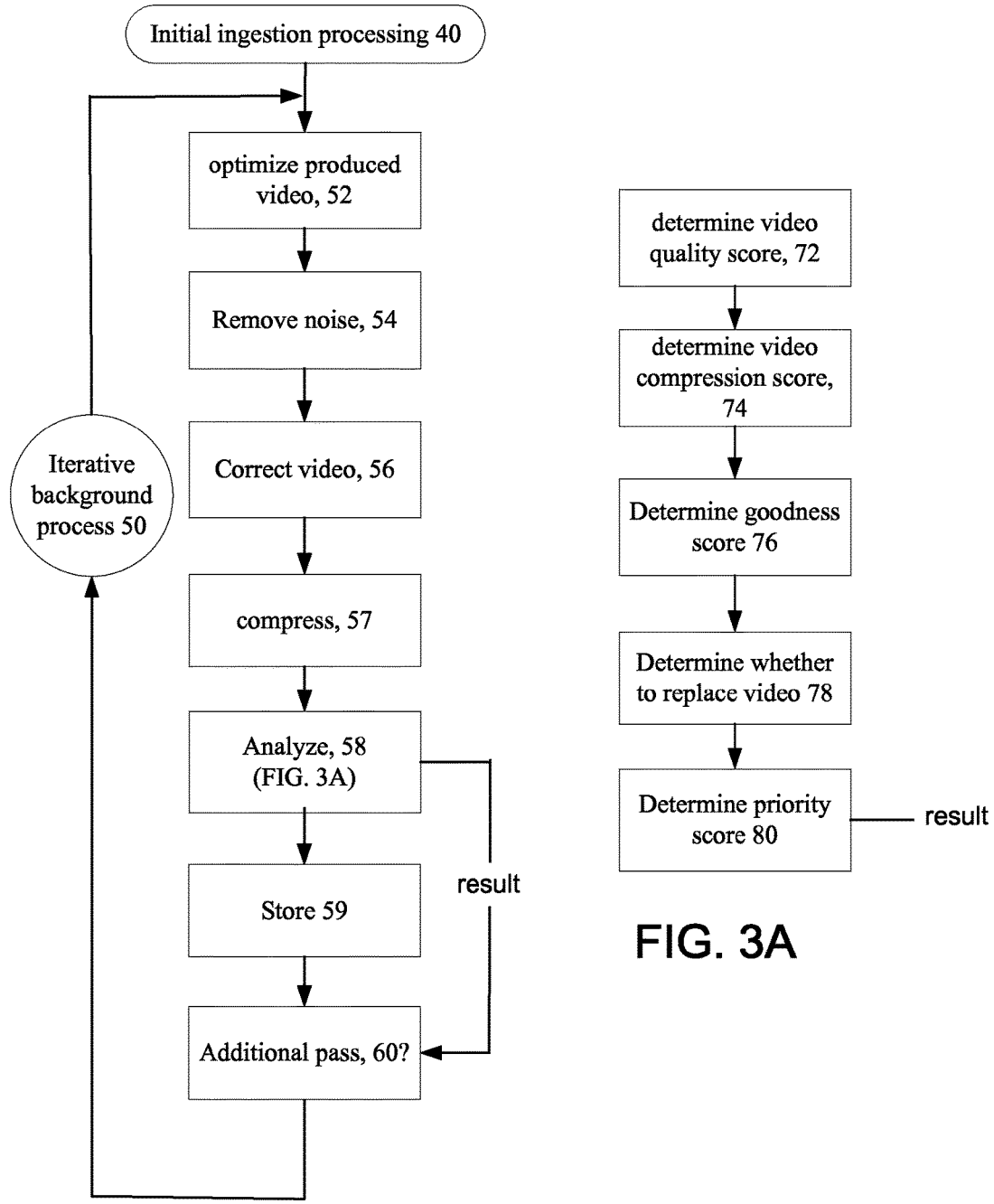
FIG. 3 is a flow chart of the incremental video optimization process.

Referring now to FIG. 3, after the initial ingestion processing 40 (FIG. 2), the video is available for playback. The processes 50 in FIG. 3 are iteratively applied (iterative passes) and can be executed plural times until a stopping condition is satisfied or the priority of additional passes becomes so low so as to obviate the need for further passes. This multi-pass process ensures that the current best version of any media is always available for viewing and downloading, while over time that same media item will be even more optimized and compressed for faster downloads and more pleasing viewing. The multi-pass processing is executed incrementally, e.g., in some implementations as a background process during slow times, so the fastest indexing process can be performed quickly to allow immediate access to the media. Over time, more sophisticated processes can be executed to incrementally improve the playback experience as warranted by the analysis step 58 (discussed below).

Although steps in this process are sequenced in the FIG. 3, they can be run in a different order and include various optimization steps. These steps are depicted as an example of the types of processing and a possible sequence of how the types of processing can be performed on the video.

The video is first optimized 52 by cleaning up the image and audio track. For example, in videos with human subjects, the head typically bobs in synchronization with the individual's heartbeat. While this is typically unnoticeable to viewers, the image of the head moves by a few pixels in a circular manner. This head-bob movement can be eliminated to provider smoother playback and higher rates of compression. Another example for human subjects is the periodic flush in skin color synchronized with the individual's heartbeat. This minute change in color can be eliminated without adversely affecting perceived image quality, while dramatically improving image compression.

The video is processed to remove noise 54. This can include pixel-based image processing (e.g., applying different techniques to smooth and blend the image, such as a Ricker wavelet function to reduce random pixilation and reduce background noise (in an audio track)).

Corrections can be applied 56 to the video to further improve the video. Such "corrections" include, e.g., applying filters to increase line sharpness and filters to increase image frame alignment to reduce hand-shaking movements, as well as color alignment to reduce small shading fluctuations, and voice enhancement and smoothing techniques. These noise-reduction and correction techniques often can enhance the perceived video quality while allowing for higher rates of compression.

The video is compressed 57 to reduce the amount of storage space required to store the video. Compression 57 can include reducing the image resolution and/or frame rate, as well as video compression techniques. This approach is not limited to a single compression algorithm, as many algorithms can be applied in parallel to see which ones produce the best result and/or successively applied to further reduce the media file size over time.

As each iteration through the video optimization process completes, analysis 58 is performed to evaluate the iteration results. Analysis 58 forms a result that is applied at box 60 "Additional pass." This analysis 58 can be very simple or complex. The goal of the analysis 58 is to produce the determination result that indicates whether an additional iterative should be applied to the video. One exemplary analysis 58 determines whether a current iteration result, e.g., the file size of the video, is better than (has a smaller file size) than the previous iteration's file size, and typically by a threshold amount. If the analysis 58 determines that the files sizes are about the same or the current iterative result file size is not smaller than the threshold amount, or the degree of compression achieved meets or exceeds expected levels for the particular type of video, then the analysis can produce a result that indicates that no further iterations (or low priority iterations) should occur 60.

Values for the threshold (a minimum percentage value) can be set by users and can be predicated on existing capabilities of various compression techniques. For example the minimum percentage value can be expressed in percentages of compression and can be, e.g., 1-2% up to e.g., 3-7%. That is, so long as the minimum percentage of compression is achieved in a prior pass, a video is a candidate for a subsequent pass. At any point, such as after analysis 58, the video file is stored 59. Other types of processing can be applied the video file in an iterative matter as illustrated in FIG. 3.

Referring now to FIG. 3A, a technique to determine if the current iteration result is superior to the prior best video version, is shown. The analysis step 58 determines 76 a "video optimization score" where a higher score indicates a more desirable outcome. The technique 58 determines 72 a video quality score and determines 74 a compression score. The video optimization score is a function of the video quality score 72 and compression score 74. The video optimization score function is determined 76 from the above video quality and compression scores 72 and 74. The video optimization score represents a balance between video quality and compression for the video. The process determines whether to replace 78 the video and determines 80 a priority score for a subsequent pass of the video.

Figure 4:
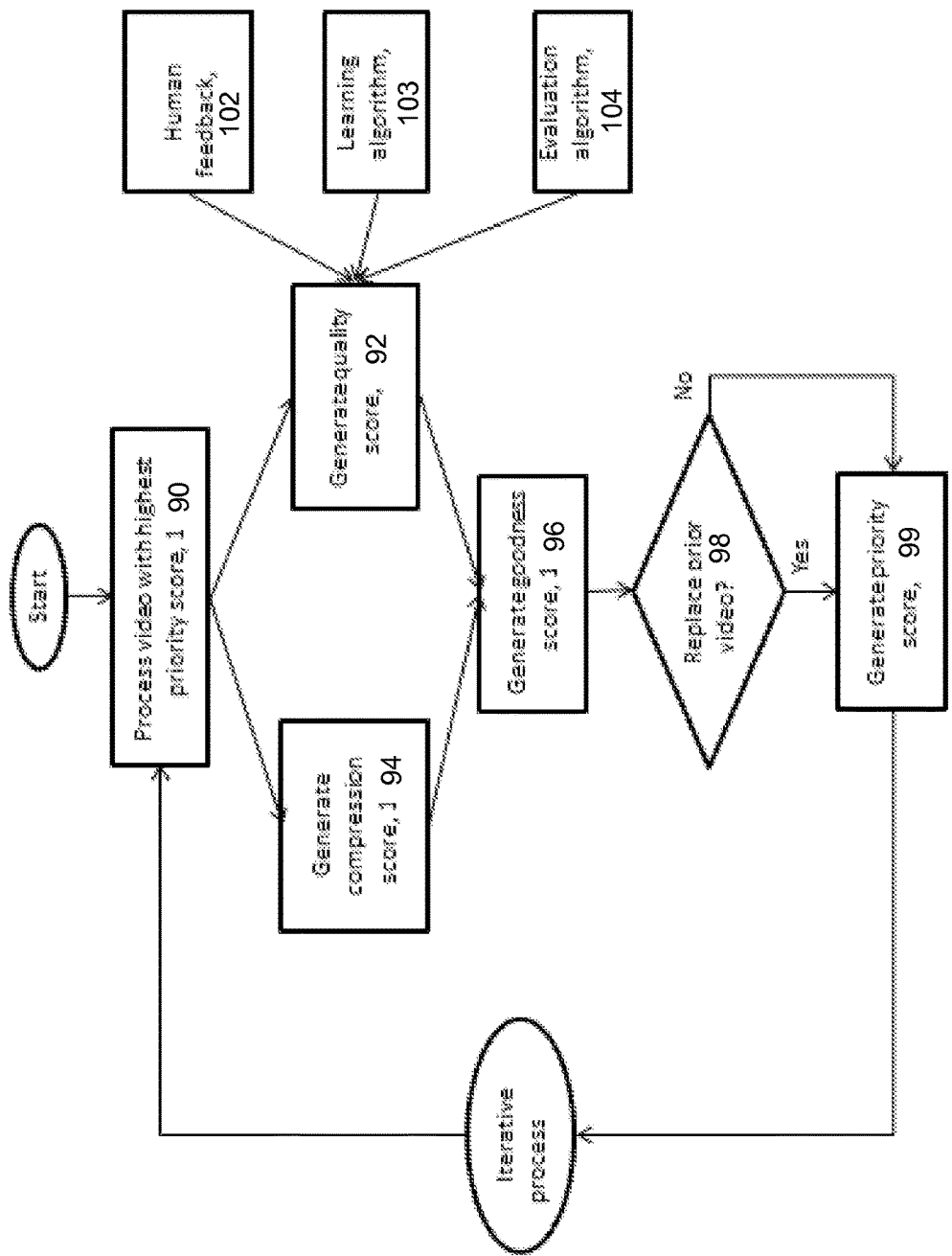
FIG. 4 is a flow chart of priority and replacement processing.

Referring now to FIG. 4, an integrated technique for processing videos determines 90 the video with the highest priority score, determines 92 a video quality score and determines 94 a compression score representing compressed size/playback performance. The video optimization score is determined 96 as a function of the video quality score and compression score representing compressed size/playback performance. The process determines whether to replace 98 the video and determines 100 a priority for applying the iterative processing (FIG. 3).

Acceptable video quality scoring 72 or 92 (FIG. 3 or 4) can be judged by a human and/or a quality score can be generated by a computer algorithm. Human interpretation 102 can be proactive and as simple as presenting an image or video segment and requesting a scaled rating from the user (e.g., poor, acceptable, good), or a numerical rating, e.g., 1 to 10, or presenting two or more images/segments and asking the user to pick the "best" one (or "don't care"). Human feedback 102 also could be passive by simply providing a "Poor quality" button the user can click to indicate the video quality is unacceptable. Previously iteration(s) are stored and can be used to roll-back the available video to one of the previous iteration(s) if a new iteration receives unacceptable user ratings. Over a sample of videos, different techniques, and user ratings, the system can "learn" the best combination of techniques that produce the highest video optimization score. Human ratings can be used on an ongoing basis or as a set of initial training samples for a learning algorithm 103 (e.g., a neural network) to generate a video quality score. The system can configure the frequency of human ratings and they can decrease over time as the system learns.

Furthermore, the system can evaluate 104 the best set of techniques/approaches to apply to different video categories (e.g., human face/head/shoulder shot vs. a full-person view vs. landscape vs. presentation slides). In videos where one or more persons are shown, the background may be irrelevant and could be blended and/or eliminated, head movements may be unimportant, while facial expressions are paramount. In presentation slides, text backgrounds and animations may not be key to effective communication of the content/ideas. Videos can be manually labeled with simple categories or the categories can be automatically detected by the system, allowing a more directed/optimized set of techniques to be applied given the contextual information, rather than a less efficient application of random or general techniques.

The compression score 74 and 94 (e.g., video size or playback performance) can be simply represented as the video size or as a measure of playback performance (e.g., if video decompression is needed). The video optimization score is determined 76 or 96 from the above video quality and compression scores 72, 92, and 74, and finds the proper balance of video quality and compression for the application. Some applications/users may choose lower image quality in a trade-off for faster playback performance, while others may require higher resolution image quality.

An exemplary video optimization score is determined as:

Video optimization score $G_S$ equals video quality score $(V_Q)$ times compression score $(V_C)$ or $G_S=(V_Q)*(V_C)$ where:

Video quality score is normalized between 1 and 10.

Video compression score can be related to data compression ratio of the file and for example compression ratios can be mapped into a numeric range (1 to 10).

Thus, a video optimization score $G_S$ where the Video quality score is 7 and the Video compression score is 4 would be $G_S=(V_Q)*(V_C)$ or 7*4 or 28. Other techniques for producing Gs can be provided.

If the output format of the video requires an additional decompression, this is considered as part of the playback performance. For example, a video could be compressed and represented by one or more sets of neural network weights that have learned the output for each image frame in a video. A secondary neural network could be cascaded and used to correct errors generated by the first neural network to produce a solution that converges more quickly and generates a higher quality reconstruction of the original video.

Another example of a compression technique requiring decompression would be using fractals to compact the video.

Using the video optimization score 96, the system determines 98 whether the prior best video version will be replaced by the current iteration video and generates 99 a priority score. Prior video versions and/or the techniques applied and resulting video optimization score can be saved. This provides the ability to revert to (or re-generate) a previous version if ongoing human feedback is negative (e.g., multiple complaints received on video quality), as well as the ability to continue searching for improved results starting from previous versions.

The system determines 98 the "priority" score representing when (relative to other videos) the video should be processed again iteratively to try to improve the video optimization score. The priority score is a function of the current video optimization score relative to the expected maximum video optimization score (i.e., degree of potential improvement based on experience with other similar videos) and the level of expected future playback (e.g., # of predicted views). The number of total views over the video lifetime can be predicted as a function of multiple variables, including the video author, subject/title, description/content, length, keywords/tags, etc. Other key inputs are the channel or sharing information for the video (e.g., a video posted to a company-wide "Key messages from our executives" channel is likely to receive many more views than a video shared with only one other user) and the number of playbacks to date (e.g., already viewed by 12 of 100 users or 3 of 5 users).

Based on the historical playback frequency and the time horizon of similar videos, the system can predict the future demand for playback of a video (e.g., if videos of this type are typically all watched within a week of release and rarely watched again (e.g., manager review of quarter-end sales results and call to action), whether the video is watched by on an repeated and/or ongoing basis (e.g., annual training recertification or best practices), or watched just once (e.g., peer review of a practice presentation). The system assigns a higher priority score to videos that will be watched more frequently in the future. As computing resources are limited, the application of CPU to video optimization is performed in a sequence (can be serially or in parallel) that generates the highest benefit, as reflected by the priority score 99.

A suitable cloud architecture is any commercially available architecture. When upload to the cloud a client device initiate publish API call is made to upload the content metadata that is persisted in the database. A publish content chunks API call is made to upload the video chunks of uniform size, e.g., 128 Kbytes or other suitable sizes. The file chunks are persisted in the cloud.

Embodiments can be implemented in digital electronic circuitry, or in computer hardware, firmware, software, or in combinations thereof. Embodiments can be implemented in a computer program product tangibly stored in a machine-readable (e.g., computer readable) hardware storage device for execution by a programmable processor; and method actions can be performed by a programmable processor executing a program of instructions to perform functions of the invention by operating on input data and generating output. Embodiments can be implemented advantageously in one or more computer programs executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory and/or other hardware storage devices. Generally, a computer will include one or more mass storage devices for storing data files; such devices include magnetic disks, such as internal hard disks and removable disks; magneto-optical disks; and optical disks. Hardware storage devices suitable for tangibly storing computer program instructions and data include all forms of volatile memory, e.g., semiconductor random access memory (RAM), all forms of non-volatile memory, including by way of example semiconductor memory devices, such as EPROM, EEPROM, and flash memory devices; magnetic disks such as internal hard disks and removable disks; magneto-optical disks; and CD ROM disks. Any of the foregoing can be supplemented by, or incorporated in, ASICs (application-specific integrated circuits).

A number of embodiments of the invention have been described. The embodiments can be put to various uses, such as educational, job performance enhancement, e.g., sales force and so forth. Nevertheless, it will be understood that various modifications may be made without departing from the spirit and scope of the invention.

What is claimed is:

1. A system comprises:
a processor;
memory storing a computer program product for improving quality of video files, the computer program product comprising instructions for causing the processor to:
apply a set of batch processes over multiple passes to optimize a video, by configuring the processor to:
apply one or more of the processes from the set to the video to optimize an aspect of video quality of the video to provide an optimized video;
determine a video quality score ($V_Q$) for the optimized video based on the one or more processes that were applied to the video;
compress the optimized video to produce a compressed representation of the optimized video having a smaller file size than a file size prior to compressing the optimized video;
determine a video compression score ($V_C$) from the optimized compressed video;
determine a video optimization score ($G_S$) for the optimized compressed video that is based at least in part on the determined video quality score and determined video compression score according to $G_S=(V_Q)*(V_C)$; and
analyze the video optimization score to determine whether to provide an additional pass to provide another optimization to the optimized video or whether the optimized iteration of the video should be stored, and when the optimized iteration should be stored, the system is configured to store the optimized iteration as the optimized video.

2. The system of claim 1 wherein a first one of the processes, configures the processor to incrementally remove noise from the video.

3. The system of claim 1 wherein a first one of the processes, configures the processor to incrementally correct the video by aligning frames of video to remove handshaking movements.

4. The system of claim 1 wherein a first one of the processes, configures the processor to incrementally correct the video by applying a pixel-based image processing to smooth and blend the image.

5. The system of claim 1 wherein a first one of the processes, configures the processor to incrementally correct the video by applying a Ricker wavelet function to reduce random pixilation.

6. The system of claim 1 wherein the video is self-captured video.

7. The system of claim 1 wherein the processor is configured by the program to incrementally execute the functions of the program.

8. The system of claim 1 wherein the processor is configured by the program to incrementally execute the functions of the program as a background process.

9. The system of claim 1 wherein the processor is configured by the program to:
determine when a stopping condition is satisfied to obviate the need for further passes.

10. The system of claim 1 wherein the processor is configured by the program to:
determine a priority score representing when relative to other videos, the video should be processed to apply the set of batch processes.

11. The system of claim 1 wherein the video quality score, video compression score and video optimization score are a first video quality score, a first video compression score and a first video optimization score, and the processor is configured by the program to:
determine a second video quality score;
determine a second video compression score; and
determine a second video optimization score based at least in part of the determined second video and second compression scores.

12. The system of claim 1 wherein the determined video optimization score is used to determine whether the optimized video should replace a previous optimized video.

13. A computer-implemented method comprises:
applying by one or more computer systems a set of batch processes over multiple passes to optimize a video, by:
applying one or more processes to the video to optimize an aspect of video quality to provide an optimized video;
determining a video quality score ($V_Q$) for the optimized video based on the one or more processes that were applied to the video;
compressing the optimized video to produce a compressed representation of the optimized video having a smaller file size than a file size prior to compressing the optimized video;
determining a video compression ($V_C$) score for the optimized compressed video;
determining a video optimization score ($G_S$) for the optimized compressed video that is based on the determined video quality score and determined video compression score according to $G_S=(V_Q)*(V_C)$; and
analyzing the video optimization score to determine whether to provide an additional pass provide another optimization to the optimized video or whether the optimized iteration of the video should be stored, and when the optimized iteration should be stored, the system is configured to store the optimized iteration as the optimized video.

14. The method of claim 13 wherein one of the set of processes comprises:
incrementally removing noise from the video.

15. The method of claim 13 wherein one of the set of processes comprises:
incrementally correcting the video by aligning frames of video to remove handshaking movements.

16. The method of claim 13 wherein one of the set of processes comprises:
incrementally correct the video by applying a pixel-based image processing to smooth and blend the image.

17. The method of claim 13 wherein one of the set of processes comprises:
incrementally correcting the video by applying a Ricker wavelet function to reduce random pixilation.

18. The method of claim 13 wherein one of the set of processes comprises:
incrementally correcting as a background process.

19. The method of claim 13 wherein one of the set of processes comprises:
determining when a stopping condition is satisfied to obviate the need for further passes.

20. The method of claim 13 wherein one of the set of processes comprises:
determining a priority score representing when relative to other videos the video should be processed to apply the set of batch processes.

21. A computer program product tangibly stored on a computer readable hardware storage device for improving quality of video files, the computer program product comprises instructions for causing a processor to:
apply a set of batch processes over multiple passes to optimize a video;
apply one or more processes to the video to optimize an aspect of video quality of the video to provide an optimized video;
determine a video quality score ($V_Q$) for the optimized video based on the one or more processes that were applied to the video;
compress the optimized video to produce a compressed representation of the optimized video having a smaller file size than a file size prior to compressing the optimized video;
determine a video compression score ($V_C$) from the optimized compressed video;
determine a video optimization score for the optimized compressed video that is based on the determined video quality score and determined video compression score according $G_S=(V_Q)*(V_C)$; and
analyze the video optimization score ($G_S$) to determine whether to provide an additional pass to provide another optimization to the optimized video or whether the optimized iteration of the video should be stored, and when the optimized iteration should be stored, the system is configured to store the optimized iteration as the optimized video.

22. The computer program product of claim 21 wherein one of the set of processes comprises instructions to:
correct the video by aligning frames of video to remove handshaking movements.

23. The computer program product of claim 21 wherein one of the set of processes comprises instructions to:
correct the video by applying a pixel-based image processing to smooth and blend the image.

24. The computer program product of claim 21 wherein one of the set of processes comprises instructions to:
  correct the video by applying a Ricker wavelet function to reduce random pixilation.

25. The computer program product of claim 21 wherein one of the set of processes comprises instructions to:
  correct as a background process.

26. The computer program product of claim 21 wherein one of the set of processes comprises instructions to:
  determine when a stopping condition is satisfied to obviate the need for further passes.

27. The computer program product of claim 21 wherein one of the set of processes comprises instructions to:
  determine a priority score representing when relative to other videos the video should be processed.

* * * * *